United States Patent [19]
Buckland

[11] 3,855,881
[45] Dec. 24, 1974

[54] TOOL FOR INSERTING A REPAIR PLUG AND PATCH IN A WIRE CORD TIRE

[75] Inventor: Paul S. Buckland, Akron, Ohio

[73] Assignee: The Goodyear Tire & Rubber Company, Akron, Ohio

[22] Filed: June 28, 1973

[21] Appl. No.: 374,707

[52] U.S. Cl. ............................................. 81/15.7
[51] Int. Cl. ............................................. B60c 25/16
[58] Field of Search ............................ 81/15.7, 15.2

[56] References Cited
UNITED STATES PATENTS

| | | | |
|---|---|---|---|
| 490,369 | 1/1893 | Sloper | 81/15.5 |
| 681,089 | 8/1901 | White | 81/15.7 |
| 1,215,349 | 2/1917 | Dierig | 81/15.7 |
| 1,545,831 | 7/1925 | Hirst | 81/15.7 |
| 1,594,031 | 7/1926 | Young | 81/15.7 |
| 1,859,305 | 5/1932 | Littlefield | 81/15.7 |
| 2,990,736 | 7/1961 | Crandall | 81/15.7 |

FOREIGN PATENTS OR APPLICATIONS

| | | | |
|---|---|---|---|
| 305,196 | 6/1929 | Great Britain | 81/15.7 |

*Primary Examiner*—Al Lawrence Smith
*Assistant Examiner*—Roscoe V. Parker
*Attorney, Agent, or Firm*—F. W. Brunner; H. E. Hummer

[57] ABSTRACT

A tool for positioning combination plug-patches used in repairing nail holes, or other small punctures in tires reinforced with metal cords. The tool is employed in placing in the nail hole, a shield for protecting the plug portion of the plug-patch, from any frayed wire as it is forced through the nail hole. The protective sleeve is then removed, leaving the plug-patch intact for repairing the nail hole.

2 Claims, 5 Drawing Figures

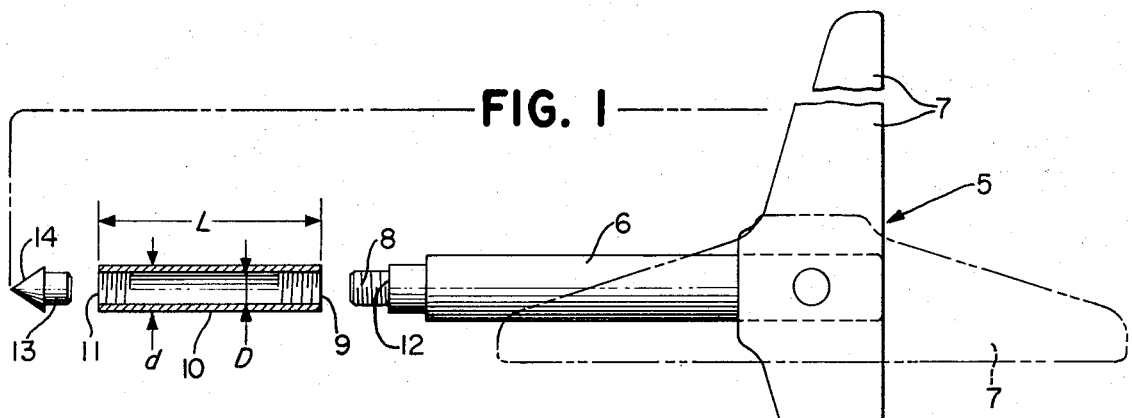
FIG. 1
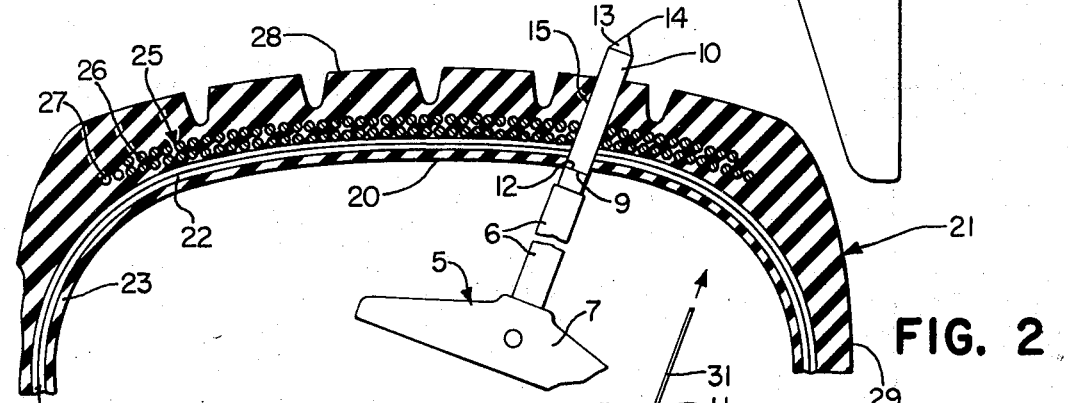
FIG. 2
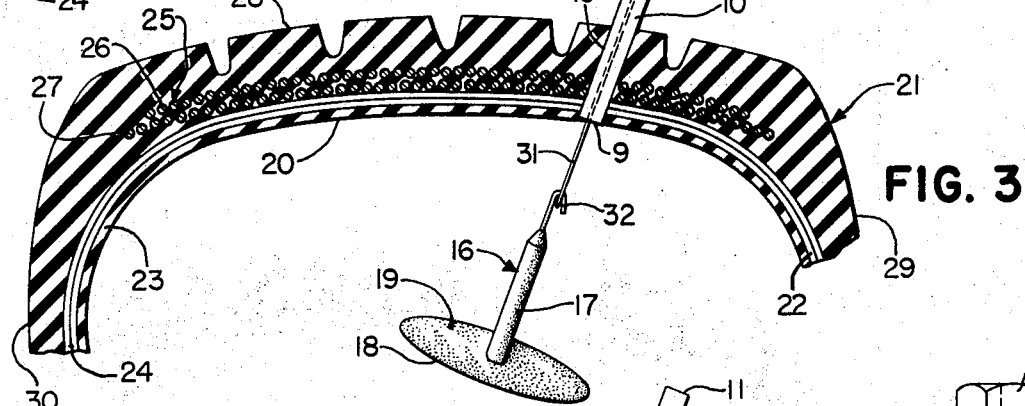
FIG. 3
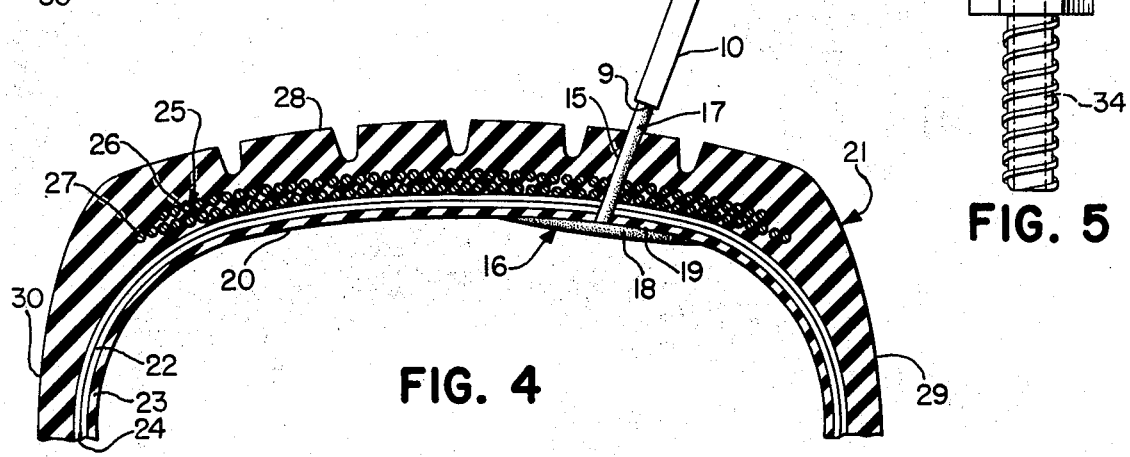
FIG. 4
FIG. 5

TOOL FOR INSERTING A REPAIR PLUG AND PATCH IN A WIRE CORD TIRE

BACKGROUND OF THE INVENTION

The invention is particularly well suited for use in the repair of tires reinforced with wire tire cords, especially in the repair of small punctures, such as nail holes requiring a combination plug-patch for properly sealing the puncture. A plug-patch is similar to a mushroom in that the plug portion resembles the stem of the mushroom, and the patch portion resembles the cap of the mushroom. The plug portion is designed to fill the nail hole, and the patch portion is provided with a gummed surface for adhering to the inner curved surface of the tire to effectively seal the nail hole, or puncture.

Some plug-patches, presently on the market, are provided with a pointed, split shield, which is composed of lightweight metal crimped around the plug portion. This particular metal shield, however, is split and has a joint extending the length of the shield, making it capable of being tightly squeezed against the plug portion to hamper removal of the shield after the plug-patch is positioned for sealing the puncture. Moreover, the lightweight metal shield can be easily distorted to grip the plug portion so tightly that the plug portion will be damaged as the metal shield is removed from the puncture and around the plug portion.

The provision of a metal shield is important, because the rubber plug portions are highly susceptible to being chewed up and ruined upon contacting any of the metal reinforcement cords of the tire, especially a frayed metal cord which has been partially ruptured by a nail, or other instrumentality puncturing the tire. The invention is directed to providing a tool, including a highly improved metal protective shield, for repairing punctures in tires.

Briefly stated, the invention is in a tool for inserting a combination plug-patch in a puncture such as a nail hole in a tire reinforced with wire cords. The tool comprises a handle for gripping the tool and an elongated, hollow, cylindrically shaped shield which is insertable in the puncture and detachable from the handle. The shield has a uniform diameter from end-to-end or throughout its length.

DESCRIPTION OF THE DRAWING

The following description of the invention will be better understood by having reference to the annexed drawing, wherein:

FIG. 1 is an exploded side view of a tool made in accordance with the invention, showing the protective shield in section;

FIGS. 2-4 are similar sections of a tire illustrating the use of the tool in repairing a puncture in the tire, and FIG. 5 is a side view of a screw-type protective shield.

DESCRIPTION OF THE INVENTION

Referring specifically to FIG. 1, there is shown a tire repair tool 5 comprising an elongated body 6 extending from a handle 7 for gripping the repair tool 5. The handle 7 is rotatably mounted on the body 6 such that the handle 7 can be rotated in axial alignment with the body 6 (see dotted position of the handle) for convenient storage of the repair tool 5. The body 6 of the repair tool 5 has a free end 8 which is externally threaded for receiving the internally threaded end 9 of a sleeve or shield 10.

The shield 10 is a hollow metal cylinder having a generally uniform inside and outside diameter $d$ and $D$ from end-to-end, or throughout its length $L$. The other free end 11 of the shield 10, farthest from the handle 7, may also be internally threaded for easy removal of the shield 10, as will be explained later in greater detail. The shield 10 is threadably mounted on the free end 8 of the repair tool 5, until it strikes an abutment 12 formed in the body 6 of the repair tool 5 adjacent the free end 8. A pointed tip 13 with a conical head 14, is insertable in the adjacent free end 11 of the shield 10 to point the free blunted end 11 of the shield 10 for easier insertion in a nail hole 15 (FIG. 2), requiring a combination plug-patch 16 (FIG. 3) for sealing the puncture 15. The arrowhead-shaped tip 13 is composed of any suitable material, e.g., plastic.

The plug-patch 16 is composed of any suitable vulcanized rubber material and comprises an elongated, cylindrically shaped plug or stem 17 which is centrally disposed on a circular patch 18. The patch 18 is sufficiently large in diameter, e.g., 1½ – 2½ inches, to be provided with a gummed or tacky surface 19 for adhering to the adjacent inner curved surface, or periphery 20 of a punctured tire 21 when the plug-patch 16 is in position for sealing the puncture 15, as shown in FIG. 4. The gummed surface 19 of the patch portion 18 is normally covered with a protective piece of plastic until just prior to use.

Referring specifically to FIGS. 2-4, the punctured tire 21 has the essential components of a tire carcass 22 including a gas-impervious innerliner 23 and reinforcement cords 24 composed of any suitable material, a belt structure 25 superimposed on the tire carcass 22 and including at least two belt plies 26 and 27 composed of rubberized metallic cords, and a tread 28 and sidewalls 29 and 30 covering the tire carcass 22 and belt structure 25 and terminating at a pair of annular beads (not shown).

The repair tool 5 is readied for use by threadably mounting the metal shield 10 on the free end 8 of the repair tool 5. The plastic tip 13 is next inserted in the free end 11 of the shield 10. The handle 7 is rotated into position for gripping the tool 5 and the sleeve 10 is then forced through the nail hole 15 preferably from the inner periphery 20 of the tire 21 in the direction of the tread 28, as best seen in FIG. 2. This is in keeping with good repair practice, since forcing the shield 10 through the tire carcass 22 in the opposite direction may cause a separation of the innerliner 23 or carcass plies which is undesirable. The body 6 of the repair tool 5 is threadably disengaged from the shield 10 (FIG. 3) when the shield 10 is in position where the end 9 of the shield 10, adjacent the inner periphery 20 of the tire 21, is flush or slightly inwardly of the inner periphery 20 to permit proper seating of the patch portion 18 against the inner periphery 20 of the tire 21.

The arrow tip 13 is then removed to clear the hollow shield 10 which is sufficiently rigid to prevent undesirable distortion of the shield 10. A wire 31 is passed through the hollow shield 10 and secured to the free end 32 of the plug 17 of a plug-patch 16 suitable for repairing the puncture 15. The plug 17 is then pulled through the hollow shield 10 until the patch 18 is firmly seated against the inner periphery or surface 20 of the tire 21 (FIG. 4).

The wire 31 is then detached from the plug 17. The repair tool 5 is next rethreaded to the internally threaded end 11 of the shield 10 extending from the nail puncture 15 and the shield 10 is pulled from the nail puncture 15 and around the plug 17, leaving the plug-patch 16 in position for sealing the puncture 15. An appropriate rubber cement is preferably spread on the inner periphery 20 around the puncture 15, prior to positioning the plug-patch 16. In cases where the exposed end 11 of the sleeve 10 is not internally threaded, a conventional pair of pliers may be used for grabbing the shield 10 and extracting it from the puncture 15. Excessive plug material is cut flush with the tread 28 to complete the repair of the tire 21. It can be appreciated that the inside diameter $d$ of the sleeve 10 should be slightly larger than the corresponding diameter of the plug 17 to facilitate passage of the plug 17 through the hollow sleeve 10. The sleeve 10 also acts to enlarge the puncture 15 for receiving the plug 17 which is compressed within the puncture 15 after the sleeve 10 is removed.

Referring specifically to FIG. 5, there is shown another hollow shield 33 which is desirably undistortable and composed of any suitable material, e.g., plastic or metal. This particular shield 33 is essentially a threaded bolt having an internal axial bore 34 for receiving the plug 17 of a plug-patch 16. This screw-type shield 33 is manually twisted into a puncture for receiving the plug-patch 16, and then removed after the plug-patch 16 is firmly seated in position. The spiralling action of this particular screw-type shield 33 is less apt to cause separation of the carcass plies, or innerliner. Therefore, this particular shield 33 can be screwed into the puncture 15 from the outside of the tire 21.

Thus, there has been described a lightweight portable tool used for repairing a puncture requiring a combination plug-patch for sealing the puncture. The tool employs a detachable, undistortable shield which is positioned in the puncture for protecting the plug of the plug-patch from cutting and ruination by steel cords used in the reinforcement of the tire, and especially frayed steel cords caused by the puncturing instrumentality. This tool is quite different in design from those described in the U.S. Pat. Nos. 2,990,736 and 3,545,314 and used in connection with conventional plugs for sealing smaller punctures not requiring gummed patches. Most plugs are cylindrically shaped pieces of rubber which are inserted in the puncture from the outside of the tire. Some of the larger plugs, however, like those shown in the above-identified patents, have slightly enlarged heads for abutting the inner periphery, or crown of the tire. The heads of such plugs are not large enough to have gummed surfaces like regular patches, and are usually provided to facilitate positioning the plug and preventing even a slight withdrawal of the plug from the puncture. A tire repair with a plug-patch is viewed in the trade as a permanent repair, whereas one with only a plug is deemed temporary. Thus, the elements of these two repairs and the method of making them, are different and require distinctive tools, as evidenced by a comparison of the invention with the devices shown in the above patents.

What is claimed is:

1. A tool used in positioning a combination plug-patch required for repairing a puncture in a tire, comprising:
   a. an elongated, hollow, cylindrically shaped, rigid sleeve having an inside diameter which is uniform from end-to-end of the sleeve and sized to receive the plug of the plug-patch, the sleeve having opposing ends which are internally threaded;
   b. a pointed tip insertable in at least one of the opposing ends of the sleeve to provide a pointed sleeve end for entry into the puncture;
   c. means for gripping the tool, by hand, such that the sleeve can be pushed into the puncture in the tire and then pulled therefrom in the same axial direction as the sleeve is pushed into the puncture, said means including:
      I. an elongated body having opposing ends;
      II. a handle disposed at one end of the body in angular relation to the longitudinal axis of the body;
      III. means disposed at the other end of the body for threadably engaging the internally threaded ends of the sleeve, said means including an externally threaded end; and
      IV. an abutment carried by the body adjacent the threaded end of the body for engaging the cylindrical sleeve to limit threaded engagement between the sleeve and tool gripping means.

2. The tool of claim 1, which includes means for mounting the handle on the body for rotation between a first position where the handle is normal to the longitudinal axis of the body and a second position where the handle parallels the longitudinal axis of the body.

* * * * *